United States Patent
Dahl et al.

(10) Patent No.: US 11,913,278 B2
(45) Date of Patent: *Feb. 27, 2024

(54) FLOOD BARRIER GROUND SEALING ARRANGEMENT

(71) Applicant: Aquafence AS, Oslo (NO)

(72) Inventors: Fred Schandorff Dahl, Nøtterøy (NO); Francesco Rugiano Beckmann, Tønsberg (NO); Rihards Rozins, Ogre (LV); Martins Vasuks, Ventspils (LV)

(73) Assignee: Aquafence AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,512

(22) Filed: Mar. 13, 2023

(65) Prior Publication Data

US 2023/0212908 A1    Jul. 6, 2023

Related U.S. Application Data

(63) Continuation of application No. 16/760,716, filed as application No. PCT/EP2018/077363 on Oct. 8, 2018, now Pat. No. 11,629,549.

(30) Foreign Application Priority Data

Oct. 30, 2017   (NO) .................................. 20171739

(51) Int. Cl.
*E06B 9/06*   (2006.01)
*E04H 9/14*   (2006.01)
(Continued)

(52) U.S. Cl.
CPC ................ *E06B 9/06* (2013.01); *E02B 3/108* (2013.01); *E04H 9/145* (2013.01); *E02B 3/106* (2013.01); *E06B 2009/007* (2013.01)

(58) Field of Classification Search
None
See application file for complete search history.

(56) References Cited

U.S. PATENT DOCUMENTS 5,173,344 A * 12/1992 Hughes ................... E02B 3/122
                                                        428/36.1
5,470,177 A * 11/1995 Hughes ................... E02B 3/108
                                                        405/91
(Continued)

FOREIGN PATENT DOCUMENTS

CN    1932161 A    3/2007
CN    101855415 A  10/2010
(Continued)

OTHER PUBLICATIONS

International Search Report and Written Opinion dated Dec. 7, 2018 for PCT/EP2018/077363 filed on Oct. 8, 2018, 9 pages.
(Continued)

*Primary Examiner* — Joshua K Ihezie
(74) *Attorney, Agent, or Firm* — Laine IP Oy

(57) ABSTRACT

Embodiments herein relate to a ground sealing arrangement for a portable flood barrier further comprising a vertical wall. The ground sealing arrangement is arranged to be positioned on the ground. The ground sealing arrangement comprises a main sealing layer forming a main body of the ground sealing arrangement. The main sealing layer is impermeable to water. The ground sealing arrangement further comprises a bottom sealing layer arranged on a ground-facing underside of the main sealing layer. The bottom sealing layer is attached to the main sealing layer at a distance L from a peripheral edge of the main sealing layer which is most distal from the first edge of the ground sealing arrangement such that the bottom sealing layer has a free end extending from the point where the bottom sealing layer attaches to the main sealing layer towards the peripheral (Continued)

edge of the main sealing layer, and comprises a highly flexible and/or glutinous material which is stretchable and sticks to the ground when the material is soaked with water.

17 Claims, 2 Drawing Sheets

(51) Int. Cl.
*E02B 3/10* (2006.01)
*E06B 9/00* (2006.01)

(56) References Cited

U.S. PATENT DOCUMENTS

| | | | | |
|---|---|---|---|---|
| 5,971,661 | A * | 10/1999 | Johnson | E02B 3/108 |
| | | | | 405/114 |
| 6,126,362 | A * | 10/2000 | Carter | E02B 3/108 |
| | | | | 405/91 |
| 6,296,420 | B1 | 10/2001 | Garbiso | |
| 6,413,014 | B1 * | 7/2002 | Melin | E02B 3/106 |
| | | | | 405/113 |
| 6,692,188 | B1 * | 2/2004 | Walker | E02B 3/106 |
| | | | | 405/91 |
| 7,121,764 | B2 * | 10/2006 | Rorheim | E02B 3/106 |
| | | | | 405/113 |
| 7,712,998 | B2 * | 5/2010 | Salemie | E02B 3/108 |
| | | | | 256/13 |
| 8,434,967 | B2 * | 5/2013 | Nero | E06B 3/984 |
| | | | | 405/114 |
| 9,528,236 | B2 * | 12/2016 | Vickers | E02B 3/10 |
| 9,670,633 | B1 * | 6/2017 | Thieding | E02B 3/102 |
| 10,087,593 | B2 * | 10/2018 | Krogenes | E02B 3/106 |
| 11,149,392 | B2 * | 10/2021 | Haaland | E02B 3/106 |
| 11,629,549 | B2 * | 4/2023 | Dahl | E06B 9/06 |
| | | | | 160/351 |
| 2004/0045243 | A1 | 3/2004 | Lockwood et al. | |
| 2004/0096275 | A1 * | 5/2004 | Rorheim | E02B 3/102 |
| | | | | 405/114 |
| 2004/0179898 | A1 * | 9/2004 | Svensson | E02B 3/106 |
| | | | | 405/114 |
| 2015/0110558 | A1 * | 4/2015 | McKenzie | E02B 3/14 |
| | | | | 405/17 |
| 2016/0289908 | A1 * | 10/2016 | Krogenes | E02B 3/106 |
| 2016/0319504 | A1 * | 11/2016 | Vickers | E02B 3/108 |
| 2020/0256119 | A1 * | 8/2020 | Dahl | E06B 9/06 |
| 2020/0362622 | A1 * | 11/2020 | Christensen | E06B 9/0692 |
| 2021/0172136 | A1 * | 6/2021 | Haaland | E02B 3/106 |
| 2021/0301489 | A1 * | 9/2021 | Eryou | H04L 9/3247 |

FOREIGN PATENT DOCUMENTS

| | | | |
|---|---|---|---|
| CN | 104343104 A | 2/2015 | |
| CN | 105555681 A | 5/2016 | |
| DE | 19807640 A1 | 9/1998 | |
| DE | 102004054976 A1 * | 5/2006 | E02B 3/106 |
| JP | S60003310 A | 1/1985 | |
| JP | 2001525025 A | 12/2001 | |
| JP | 2004218415 A | 8/2004 | |
| JP | 2016125238 A | 7/2016 | |
| SE | 507121 C2 | 3/1998 | |
| WO | WO9851865 A1 | 11/1998 | |
| WO | WO9949143 A1 | 9/1999 | |
| WO | WO0075434 A1 | 12/2000 | |
| WO | WO2004038133 A1 | 5/2004 | |
| WO | WO2016155845 A1 | 10/2016 | |
| WO | WO2017/157935 A1 | 9/2017 | |

OTHER PUBLICATIONS

Office Action mailed in NO Patent application No. 20171739 dated Apr. 28, 2020, 2 pages.

* cited by examiner

FLOOD BARRIER GROUND SEALING ARRANGEMENT

RELATED APPLICATIONS

This application is a continuation of U.S. patent application Ser. No. 16/760,716, filed on Apr. 30, 2020, which claims priority to PCT application PCT/EP2018/077363 filed on Oct. 8, 2018, which claims priority to Norwegian patent application No. 20171739, filed on Oct. 30, 2017. The subject matter of these is incorporated by reference in their entirety.

TECHNICAL FIELD

Embodiments herein relate to a flood barrier comprising a ground sealing arrangement having sealing means for providing a seal between the ground sealing arrangement and the ground in order to form a local barrier against flood water.

BACKGROUND

Flooding, caused by melted snow, storms or heavy rain, each year causes great damage to property and sometimes also causes personal injury.

Some urban areas are especially prone to heavy rain resulting in flash floods. These floods develop abruptly and last a few hours before dissipating, e.g. thanks to local drainage systems channeling the excess water underground. During flash flood events, the short time windows of flooding is enough for businesses situated at street level to incur serious property damage and losses in revenue, if the facilities are closed down for cleanup and repairs.

Various types of barricades are used as flood barriers. An example of a barricade is the sandbag barricade. Such a barricade is, however, slow to construct, and the construction requires a lot of labor. The cleanup is also costly and cumbersome.

Flood barriers, which can be stored under controlled conditions when not in use, are known. For example, SE 507 121 describes portable flood barrier sections to be located on a ground to form a barrier against flooding water. The portable flood barrier comprises a vertical wall which along its lower edge is attached to a support plate. A tie which extends from the support plate to the wall on the flooded side of the wall prevents the wall from yielding to the pressure of the flooding water. In a collapsed configuration the wall and the support plate can be separated, and the support plate has a groove for fixing the wall. A flexible waterproof sheet prevents leakage through the connection between the wall and the support plate.

The main drawback of the flood barrier according to SE 507 121 is that water may leak underneath the support plate. US2003433176A tries to solve this problem with a flood barrier of elastic, deformable and impermeable parts and sealing mechanisms which seal against walls and surfaces. The sealing mechanism is based on hydrostatic force. The way in which the US2003433176A solution advances to the ground is through a chamber, and the flexible portion extends further from this chamber vertically to the wall, and is fastened through some sticks so that it is not free on the ground. Then only hydrostatic forces are used to force the flood barrier to be sealed to the ground, i.e. in conditions under which at least some of the flood water is at rest.

As already indicated, US2003433176A is using permanent fixation. If the barrier must be placed in a public area like a side walk, ground anchoring may be impossible. If the fagade of the building must be maintained, wall anchors may not be acceptable for permanent display. Installing the anchors or fixation may require skilled labor which can be an expensive additional cost. In some cases, the anchoring and permanent fixation is difficult to use as intended by the supplier, especially in stressful situations like imminent flooding.

Further, US2003433176A does not account for uneven ground, and would incur greatly increased seepage, e.g. if used on a somewhat tilted or curved sidewalk.

Thus, there is a need for an improved flood barrier which is easy to use and reduces the leakage of water.

SUMMARY

In view of the above, an object of the present disclosure is to overcome or at least mitigate at least some of the drawbacks related to prior art flood barriers.

This object is achieved in a first aspect according to the independent claim by a ground sealing arrangement for a portable flood barrier. The flood barrier comprises the ground sealing arrangement and a vertical wall. The vertical wall is arrangeable on the ground sealing arrangement substantially perpendicular to the ground sealing arrangement along a first edge of the ground sealing arrangement to form said flood barrier. The ground sealing arrangement is arranged to be positioned on the ground. The ground sealing arrangement comprises a main sealing layer forming a main body of the ground sealing arrangement. The main sealing layer is impermeable to water. The ground sealing arrangement further comprises a bottom sealing layer arranged on a ground-facing underside of the main sealing layer. The bottom sealing layer is attached to the main sealing layer at a distance L from a peripheral edge of the main sealing layer which is most distal from the first edge of the ground sealing arrangement. The bottom sealing layer is attached to the main sealing layer such that the bottom sealing layer has a free end extending from the point where the bottom sealing layer attaches to the main sealing layer towards the peripheral edge of the main sealing layer, when the main sealing layer and the bottom sealing layer are substantially parallel to each other. The bottom sealing layer comprises a highly flexible and/or glutinous material which is stretchable and sticks to the ground when the material is soaked with water, thereby forming a barrier preventing water to pass between the ground sealing arrangement and the ground.

According to a second aspect of embodiments herein the object is achieved by a flood barrier comprising a ground sealing arrangement according to the first aspect of embodiments.

Various embodiments of the ground sealing arrangement are defined by the dependent claims.

In other words, the present disclosure provides an improved ground sealing arrangement for a flood barrier which substantially prevents or at least mitigates water leakage underneath the flood barrier to a manageable level, thereby drastically improving the performance of the flood barrier. The ground sealing arrangement is further easy to use since it is flexible and light weight which allows it to be folded and unfolded quickly and makes it is easy to store and carry when not in use.

DETAILED DESCRIPTION

Embodiments will now be described of a portable, flood barrier provided with an improved ground sealing arrangement.

Figure 1:
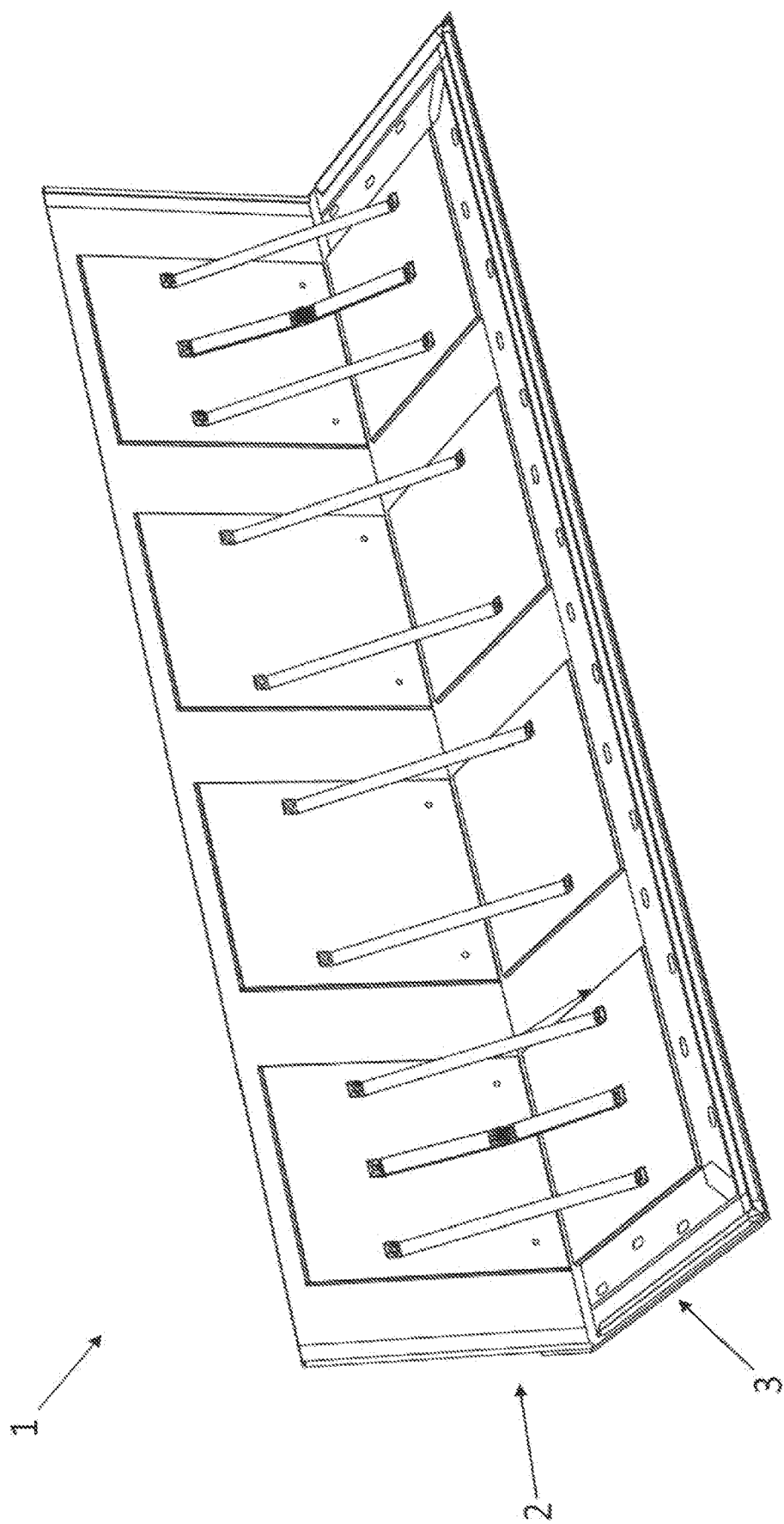
FIG. 1 is a perspective view of a flood barrier provided with a ground sealing arrangement according to the present application.

A flood barrier provided with ground sealing arrangement according to an example embodiment herein is illustrated in FIG. 1. The flood barrier may comprise the following components: a bag for storing the flood barrier in a folded state used during storage of the flood barrier, anchors for securing the flood barrier to an object when the flood barrier is in use, a main barrier 1 and at least one side closer for closing a gap between the main barrier 1 and an object to be protected when the flood barrier is in use.

The flood barrier in question may be particularly adapted to secure entry points of buildings within a few seconds. Before first time use of the flood barrier, the anchors may be mounted on the building which may then be used for anchoring the flood barrier to the building. The anchors may e.g. be mounted in the vicinity of the relevant entry point, such as e.g. on a door frame of the relevant entry point, or on a wall or a window next to said entry point. The anchors may be discrete rails or small brackets, which may be left on the building permanently, for future use.

The main barrier 1 may in a folded inactive state be stored within the bag. When the flood barrier is needed, the main barrier 1 is unfolded and may be positioned, in front of the entry point, such as e.g. a door, and flush with the surroundings of the entry point, such as e.g. a door frame. Any remaining gap between the building, such as e.g. the door frame, a wall or a window of said building, and the main barrier 1 may be sealed off by attaching at least one side closer. The main barrier 1 comprises a ground sealing arrangement 3 which is configured to be horizontally arranged on the ground and a vertical wall 2 being arranged perpendicular to the ground sealing arrangement 3 in an erected state of the main barrier 1. The vertical wall 2 may in some embodiments be removably and/or tiltably arranged on the ground sealing arrangement 3, such that the vertical wall 2 may be disassembled from the ground sealing arrangement 3 or folded towards the ground sealing arrangement 3 in order to facilitate storage of the main barrier 1.

The ground sealing arrangement 1 according to the present example embodiments drastically reduces water leakage underneath the main barrier 1, and at the same time maintains the advantages of a portable flood barrier as described above.

The concept of using the water weight for stability and sealing alone is not very efficient for low levels of water, since the low level of water does not create enough weight in order to press the ground sealing arrangement 3 of the main barrier 1 against the ground. Instead, a low level of flood water may cause the ground sealing arrangement 3 to float on top of the water which would allow the water to pass underneath the main barrier 1. In order to overcome this problem a very heavy weight could substitute the water weight for low water levels. However, this would increase the overall barrier weight prohibitively. The inventors have realized that a bottom layer arranged at the edge of the ground sealing arrangement 1 of the main barrier 1, which has the ability of sticking to the ground and thereby forming a barrier for the water, thereby preventing the water to seep below the ground sealing arrangement 3, would solve this problem. This bottom sealing layer 33 may herein also be referred to as a sticky layer or a latex layer. The characteristics of the material forming said bottom sealing layer 33 should be thin, such as e.g. thinner than the main layer, stretchy and glutinous, at least when being soaked by water. Thereby the material may be sucked into local water streams seeping under the ground sealing layer, thereby adapting to the water streams forming under the portable flood barrier to seal these off. The glutinous characteristic of the material further allows it to stick to the ground in order to form a barrier between the main layer and the ground, thus preventing or reducing the water seepage.

In some embodiments, the ground sealing arrangement 3 may also comprise a middle layer, or main sealing layer forming the main body of the ground sealing arrangement 3 of the main barrier 1 and also forming the edge of which. The middle layer may in some embodiments be a canvas layer, In further embodiments, the ground sealing arrangement 3 may further comprise an upper weight layer preventing the bottom layers from floating. The weight layer adds extra stability and weight to the bottom layer, such that the bottom layer is pressed against the ground, adapting to roughness and unevenness in the surface, and seals off water. Furthermore, for low water levels, the sticky layer is sucked into local water streams seeping under the ground sealing layers, thus reducing this seepage.

Figure 2:
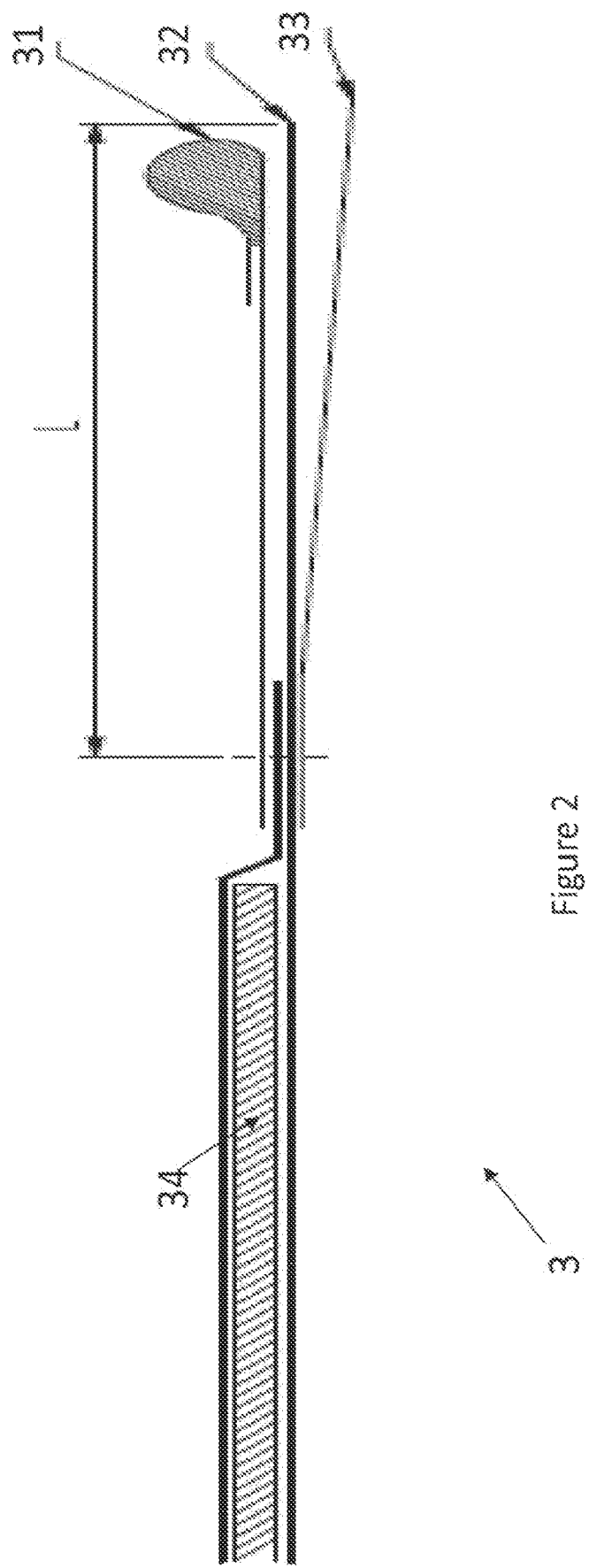
FIG. 2 illustrates an example embodiment of a ground sealing arrangement for a flood barrier with a ground sealing arrangement according to the present application.

FIG. 2 discloses a ground sealing arrangement for a flood barrier according to embodiments herein. In the following, example embodiments of a ground sealing arrangement with an improved ground sealing is discussed. The ground sealing arrangement comprises a main sealing layer 32 and a bottom sealing layer 3. The ground sealing arrangement may further comprise a weight layer 1. In these embodiments, a bottom sealing layer 33 may also be referred to as a sticky layer or a latex layer and the main sealing layer may also be referred to as a canvas layer.

Main Sealing Layer

The main sealing layer 32 forms the main body of the barrier and also the edge on the horizontal section of the flood barrier, which may also be referred to as the ground sealing arrangement of the flood barrier. When a sufficient amount of water is on top of the main sealing layer 2, the water weight will push the main sealing layer 2 downwards against the ground. The main sealing layer 32 is made of a flexible material, such as e.g. a canvas. Due to its flexibility, the main sealing layer 32 adapts quite well to the geometry of the ground surface. This effect is however most noticeable when water levels reach a certain level, such as e.g. when the water level increases beyond 150 mm. Above this water height, the main sealing layer 32 alone, provides for a water sealing mechanism which works well, also on uneven surfaces. Important characteristics of the main sealing layer 2 is light weight, flexibility and high tensile strength. Flexibility is important in order for the main sealing layer 2 to adapt to the ground. While light weight and high tensile strength are requirements for the overall system, not ground sealing by itself. The ground sealing arrangement may further comprise a support plate 4, which may be enclosed by the main sealing layer 2. The support plate 34 may e.g. be configured to connect to the vertical wall and/or one or more tie rods extending between the support plate and the vertical wall in order to support the wall against the pressure of the flood water.

Bottom Sealing Layer

The bottom sealing layer 3, which may also be referred to as a sticky layer, is the bottom ground sealing layer. The bottom sealing layer 33 comprises a highly flexible and/or glutinous material which is stretchable, i.e. has an elongation of up to 1000% and is easy to elongate, and provides a degree of friction against the ground when the material is wet such that it sticks to the ground and creates a seal between the main sealing layer 32 and the ground. This may also be referred to as the material being sticky. Thereby, water is prevented from flowing between the ground sealing arrangement and the ground. The bottom sealing layer 3 is attached to the ground-facing underside of the main sealing layer 2. The bottom sealing layer 33 is attached to the main sealing layer 32 at a distance L from the peripheral edge of the main sealing layer 32 which is most distal from the vertical wall, such that the longitudinal edges of the bottom sealing layer 33 and the main sealing layer 32 are substantially parallel to each other. The peripheral edge of the main sealing layer 32 which is most distal from the vertical wall may herein also be referred to as the distal edge of the main sealing layer 2.

The bottom sealing layer is further arranged such that it has a free end extending from the point of attachment to the main sealing layer 32 towards the distal edge of the main sealing layer 2, when the main sealing layer 32 and the bottom sealing layer 33 are substantially parallel to each other. Thereby the bottom sealing layer 33 forms a flap which projects freely towards the distal edge of the main sealing layer 2. The bottom sealing layer 33 extends over substantially the whole length of the main sealing layer 2. The free end of the bottom sealing layer 3, which may also be referred to as the flap may have substantially the same length as the distance L.

The bottom sealing layer 33 may in some embodiments be formed as a strip, which strip is attached to the ground-facing underside of the main sealing layer 32 along one of the longitudinal edges of the strip. The free longitudinal edge of the strip is arranged closer to the distal edge of the main sealing layer 32 than the longitudinal edge of the strip which is attached to the main sealing layer 2, when the main sealing layer 32 and the bottom sealing layer 33 are substantially parallel to each other. In some embodiments the strip may be 150 mm wide and 0.3 mm thick, however the dimensions of the strip are not limited to this. The bottom sealing layer 33 may extend alongside and under the edge of the main sealing layer 2, and may be connected to the main sealing layer 32 at the distance L from the distal edge of the main sealing layer 2. The distance L is smaller than 500 mm, preferably in the range of 100 to 200 mm. In some preferred embodiments the distance L may be 150 mm. The material of the bottom sealing layer 33 may in a preferred embodiment be rubber latex, which comprises the properties discussed above. The latex has high tensile strength and large elongation and is therefore both flexible and tear resistant. Also, the glutinous latex rubber has good friction when wet, and sticks on smooth surfaces similar to a suction cup, thereby making the latex rubber sticky.

Latex may float in water, however a weight layer may be added on top of the main sealing layer 32 and the bottom sealing layer 33 such that it lays flush with both the main sealing layer 2 edge and bottom sealing layer edge, which prevents both these layer edges from floating up.

When water seeps under the edge of the ground sealing arrangement, which may also be referred to as the horizontal section, the water pressure goes down locally in these streams. Since the bottom sealing layer 33 elongates so easily, it is sucked into the streams and seal these off. Since the material is glutinous, it sticks to the ground and thereby forms a barrier extending between the main sealing layer and the ground. Thus, a ground sealing is provided even if the ground surface is very rough, like e.g. old asphalt. As such, the bottom sealing layer 3 is sucked into groves and other small geometries otherwise difficult to seal off without employing large weights. Hence, hydrodynamic forces from the water flowing under the ground sealing arrangement interact with the bottom sealing layer 33 and increase the ground sealing effect of the bottom sealing layer which then decreases the water seepage under the ground sealing arrangement. Thus an initial seepage of water under the ground sealing arrangement is utilized to improve the sealing performance of the ground sealing arrangement which then will prevent or reduce further seepage of water. When the water level and weight builds up, the bottom sealing layer 33 is further pushed towards the ground by means of the hydrostatic pressure of the water, and its flexibility greatly helps it adapt to any unevenness or roughness in the surface of the ground.

Weight Layer

When the water levels reach a certain level, such as e.g. when the water level increases beyond 150 mm, the weight from the water acting on the ground sealing arrangement stabilizes the flood barrier. However, when the water level is close to zero, the flood barrier is more vulnerable, because a lot of the stabilizing water weight is missing. Therefore, extra weight may be added to the edge of the ground part of the flood barrier to increase its stability and friction in low water levels. Also, canvas may float slightly in water and in order to prevent this, weight may be added directly on top of the distal edge of the main sealing layer 2, in particular when the main sealing layer 32 is made out of canvas. The weight should be light and flexible, since one of the main benefit of these particular flood barriers is that they are portable and foldable. However, the flexibility also helps the weight layer 31 to adapt to the ground geometry. As such, the weight layer 1 is configured to add as little stiffness as possible to the distal edge of the main sealing layer 32. For example, welding the weight tube on top of the distal edge main sealing layer 32 would hamper its flexibility and may therefore be suboptimal for sealing on uneven surfaces. Thus, the weight layer 31 is preferably formed as a canvas tube with a diameter of about e.g. 12 mm which is filled with led grains such that the canvas tube has a weight of approximately 1 kg/m. The canvas tube may be welded onto the main sealing layer 32 with an offset of about 150 mm from the distal edge of the main sealing layer. The offset may e.g. be created by arranging the weight tube at one edge of a canvas sheet, which sheet may e.g. be about 150 mm wide, and welding the other edge of the canvas sheet to the main sealing layer 2, such as e.g. 150 mm from the edge of the main sealing layer. Thereby, the weight tube, and the canvas sheet, lays "freely" on top of the edge of the main sealing layer, thus adding very little extra stiffness to that section.

If air is trapped between any of the layers 31, 32, 33 this could prevent the layers from adapting to the ground geometry as intended. In order to combat this, the upper layers 1, 32 may be perforated to secure that the trapped air can escape. Thereby, unwanted buoyancy of the layers, and thereby the ground sealing arrangement, can be prevented.

One of the advantages of providing ground sealing with three layers rather than integrate the led grain into the main sealing layer 32 is that if there is an error in deployment or some situation leading to the edge of the horizontal section, i.e. the ground sealing arrangement, curling up, e.g. if someone kicks the barrier, the three-layered ground sealing arrangement will continue to provide a ground sealing which works well. If the weight tube curls up, rather than laying freely on the edge of the main sealing layer 2, this has little effect on the main sealing layer 32 and the bottom sealing layer 3, and they continue to seal as intended.

Tests with a ground sealing arrangement having two ground sealing layers, wherein the first layer comprises led balls integrated in the main sealing layer and the second layer is a bottom sealing layer indicate that seepage of water underneath the ground sealing arrangement increases twofold if such a weight tube is forcibly curled up into an unintended state. Keeping the main sealing layer 32 separate from the weight tube 31 makes the ground sealing more robust with regards to errors in installation and other unforeseen scenarios influencing the ground sealing section.

The invention claimed is:

1. A portable flood barrier comprising:
   a ground sealing arrangement configured to be arranged on the ground, the ground sealing arrangement comprising:
       a main sealing layer being impermeable to water,
       a bottom sealing layer arranged on a ground-facing underside of the main sealing layer and attached to the main sealing layer at a distance L from a peripheral edge of the main sealing layer which is most distal from a first edge of the ground sealing arrangement, wherein the bottom sealing layer has a free end extending towards the peripheral edge of the main sealing layer, and
       a weight layer coupled to the main sealing layer and arranged on top of the main sealing layer, wherein the weight layer is arranged at the peripheral edge of the main sealing layer which is most distal from the first edge of the ground sealing arrangement, wherein a free end of the main sealing layer and the free end of the bottom sealing layer are pressed against the ground by the weight layer,
   wherein the portable flood barrier further comprises a wall coupled to the first edge of the ground sealing arrangement.

2. The portable flood barrier according to claim 1, wherein the wall is tilted relative to the ground sealing arrangement.

3. The portable flood barrier according to claim 1, wherein the weight layer comprises a tube or a flexible tube.

4. The portable flood barrier according to claim 1, wherein the weight layer is welded to the main sealing layer.

5. The portable flood barrier according to claim 1, wherein the weight layer is arranged on top of a part of the main sealing layer.

6. The portable flood barrier according to claim 1, wherein the bottom sealing layer is made of rubber latex.

7. The portable flood barrier according to claim 1, wherein the main sealing layer is made of canvas.

8. The portable flood barrier according to claim 1, wherein the main sealing layer and the bottom sealing layer are substantially parallel to each other.

9. A ground sealing arrangement for a portable flood barrier, the ground sealing arrangement comprising:
   a main sealing layer being impermeable to water,
   a bottom sealing layer arranged on a ground-facing underside of the main sealing layer and attached to the main sealing layer at a distance L from a peripheral edge of the main sealing layer which is most distal from a first edge of the ground sealing arrangement, wherein the bottom sealing layer has a free end extending towards the peripheral edge of the main sealing layer, and
   a weight layer coupled to the main sealing layer and arranged on top of the main sealing layer,
   wherein the ground sealing arrangement is configured to be arranged on the ground,
   wherein the weight layer is arranged at the peripheral edge of the main sealing layer which is most distal from the first edge of the ground sealing arrangement, wherein a free end of the main sealing layer and the free end of the bottom sealing layer are pressed against the ground by the weight layer.

10. The ground sealing arrangement according to claim 9, wherein the weight layer comprises a tube or a flexible tube.

11. The ground sealing arrangement according to claim 9, wherein the weight layer is welded to the main sealing layer.

12. The ground sealing arrangement according to claim 9, wherein the weight layer is arranged on top of a part of the main sealing layer.

13. The ground sealing arrangement according to claim 9, wherein the bottom sealing layer is made of rubber latex.

14. The ground sealing arrangement according to claim 9, wherein the main sealing layer is made of canvas.

15. The ground sealing arrangement according to claim 9, wherein the main sealing layer and the bottom sealing layer are substantially parallel to each other.

16. The ground sealing arrangement according to claim 9, wherein the bottom sealing layer comprises a stretchable and flexible and/or glutinous material which sticks to the ground when the material is wet.

17. The ground sealing arrangement according to claim 9, wherein the free end forming a flap of the bottom sealing layer has substantially the same length as the distance L.

* * * * *